(12) United States Patent
Gurin

(10) Patent No.: US 12,481,601 B2
(45) Date of Patent: Nov. 25, 2025

(54) METHOD AND SYSTEM FOR SECURE BACKUP MANAGEMENT OF REMOTE COMPUTING MACHINES USING QUANTUM KEY DISTRIBUTION AND ENCRYPTED RAM

(71) Applicant: Oleg Dmitrievich Gurin, Suzdal (RU)

(72) Inventor: Oleg Dmitrievich Gurin, Suzdal (RU)

( * ) Notice: Subject to any disclaimer, the term of this patent is extended or adjusted under 35 U.S.C. 154(b) by 228 days.

(21) Appl. No.: 18/027,187

(22) PCT Filed: Aug. 27, 2021

(86) PCT No.: PCT/RU2021/050280
§ 371 (c)(1),
(2) Date: Aug. 3, 2023

(87) PCT Pub. No.: WO2022/066051
PCT Pub. Date: Mar. 31, 2022

(65) Prior Publication Data
US 2024/0045811 A1 Feb. 8, 2024

(30) Foreign Application Priority Data

Sep. 23, 2020 (RU) .......................... RU2020131335

(51) Int. Cl.
*G06F 12/14* (2006.01)
*G06F 15/16* (2006.01)
*H04L 9/08* (2006.01)

(52) U.S. Cl.
CPC ........ *G06F 12/1408* (2013.01); *H04L 9/0852* (2013.01); *G06F 2212/1052* (2013.01)

(58) Field of Classification Search
CPC ......... G06F 12/1408; G06F 2212/1052; H04L 9/0852

(Continued)

(56) References Cited

U.S. PATENT DOCUMENTS 7,383,462 B2 *   6/2008   Osaki ................... H04L 9/0894
                                                        714/6.32
8,311,985 B2 *  11/2012   O'Keefe ............. G06F 11/1458
                                                        707/822

(Continued)

FOREIGN PATENT DOCUMENTS

RU             2531569 C2       10/2014

OTHER PUBLICATIONS

Geeta Sharma; Identity based secure authentication scheme based on quantum key distribution for cloud computing; Springer:2018 ; pp. 1-18.*

(Continued)

*Primary Examiner* — Monjur Rahim

(57) ABSTRACT

This technical solution relates to the field of digital data processing, in particular to the methods of managing backups of computer devices. The technical result is an increase in the security of backups due to using symmetric cryptographic keys transmitted over a quantum channel, each of which corresponds to a specific backup. The technical result is achieved due to a computer-implemented method of secure management of backup copies of RCM, with the function of RAM encryption on the CPU, using quantum key distribution (QKD), under which: a connection is formed between the RCM, at least one user device and a QKD device, while the QKD device creates a quantum channel, which connects the RCM with user devices, and the RCM and the user devices are connected via a data network; QKD device creates symmetric cryptographic keys, one of one of which is transmitted to the user device for storing registry keys, and the second is transferred to RCM, after receiving the key to the RCM, a backup copy (BC) is created with the help of the central processor, state of the processor memory in a given time is encrypted and transferred to a persistent data storage; and the RCM backup is performed (Continued)

through the following stages: a command from user device to restore the BC is sent, and said command contains a cryptographic key, which was used to form the required BC, encrypted using a new symmetric key derived from the QKD device; in response to a received command, the transmission of the BC to the RAM of RCM is performed; the QKD device is used to transmit said new symmetric key to the CPU and decrypt the primary key; the central processor with the relevant cryptographic key for the BC is used to restore the RCM, and said RCM is stored in RAM and contains the relevant state of the encrypted RAM of the RCM.

22 Claims, 5 Drawing Sheets

(58) Field of Classification Search
USPC .......................................................... 713/193
See application file for complete search history.

(56) References Cited

U.S. PATENT DOCUMENTS

| | | | |
|---|---|---|---|
| 9,411,524 B2* | 8/2016 | O'Hare | G06F 21/85 |
| 11,108,550 B1* | 8/2021 | Esbensen | G06F 21/64 |
| 11,533,175 B1* | 12/2022 | Rao | G06Q 20/20 |
| 11,995,194 B1* | 5/2024 | Shea | H04L 9/0852 |
| 2006/0005048 A1* | 1/2006 | Osaki | G06F 21/6218 713/193 |
| 2010/0070476 A1* | 3/2010 | O'Keefe | G06F 11/1458 718/1 |
| 2010/0318782 A1* | 12/2010 | Auradkar | G06F 11/1451 726/4 |
| 2012/0017114 A1* | 1/2012 | Timashev | G06F 11/1451 714/15 |
| 2012/0284236 A1* | 11/2012 | Timashev | G06F 11/1458 707/674 |
| 2013/0034229 A1* | 2/2013 | Sauerwald | G06F 11/1458 380/46 |
| 2013/0208894 A1* | 8/2013 | Bovino | H04L 9/0852 380/278 |
| 2014/0068258 A1* | 3/2014 | Chao | G06F 11/1469 713/167 |
| 2018/0165224 A1* | 6/2018 | Brown | G06F 21/57 |
| 2018/0307848 A1* | 10/2018 | Leiseboer | G06F 21/78 |
| 2018/0367309 A1* | 12/2018 | Reinhold | H04L 9/0662 |
| 2021/0319353 A1* | 10/2021 | Sarpatwar | H04L 9/3297 |
| 2022/0038289 A1* | 2/2022 | Huang | H04L 63/12 |

OTHER PUBLICATIONS

White paper. AMD SEV-SMP: Strengthening VM Isolation with integrity Protection and More.

* cited by examiner

METHOD AND SYSTEM FOR SECURE BACKUP MANAGEMENT OF REMOTE COMPUTING MACHINES USING QUANTUM KEY DISTRIBUTION AND ENCRYPTED RAM

FIELD OF TECHNOLOGY

This technical solution relates to the field of digital data processing, in particular to the methods of managing backups of computer devices.

PRIOR ART

It is critically important to maintain stable performance and security of the computing infrastructure and confidentiality of user data for computing capacities, in particular server clusters, data centers, cloud computing systems, etc., which provide the end user with the ability to exchange and process large amounts of data.

One of the important aspects for implementing a secure environment for remote computing machines (RCM), for example, servers, is monitoring their state with RAM protection for creating backups and their subsequent recovery by a trusted user. This process can be carried out by encrypting the state of random-access memory (RAM) using cryptographic keys.

An example of such technology is Secure Encrypted Virtualization (SEV) by AMD (https://www.amd.com/system/files/TechDocs/SEV-SNP-strengthening-vm-isolation-with-integrity-protection-and-more.pdf) which provides hardware encryption of RAM on the central processor (memory controller), which provides increased security when managing computing clusters. This solution is also disclosed in the application for invention US 20180165224 A1 (ATI Technologies ULC, Jun. 14, 2018), which describes an approach to isolating access between virtual machines (VM) with checking the integrity of parameters when encrypting their state in RAM.

However, this approach has a limitation that leads to the vulnerability of the system, to the extent that AMD SEV technology is designed to isolate VMs from each other and from external entities by encrypting the area of RAM, i.e., the key for encrypting the area of RAM is generated by the CPU at the time of VM start and is used afterwards, keeping it within the RAM. Currently, the "snapshot" technology is often used to create a backup copy of the VM state, which implies copying the area of RAM to a file. Since the RAM area data was encrypted by the central processor when copying it, the backup copy (BC) will also be encrypted. You will have to store the encryption key on the RCM to decrypt the copy in the future, which leads to a decrease in the security of information on the RCM.

The claimed solution is aimed at eliminating the disadvantages inherent in existing solutions, since the key is always stored with the user, and not on the RCM to which it is transmitted at the time of recovery of the BC, while the key does not leave the processor circuit, which does not allow for the possibility of decrypting the RAM snapshot to restore the state of the device and increases data security.

SUMMARY OF INVENTION

To solve a technical problem in terms of increasing the protection of backups of the states of remote machines, proposed a new method of encryption and recovery of backups using quantum key distribution (QKD).

The technical result of the proposed invention provide increase in the security of backups due to using symmetric cryptographic keys transmitted over a quantum channel, each of which corresponds to a specific backup.

The claimed technical result is achieved through a computer-implemented method for securely managing backups of the states of remote computing machines (RCM), with the function of encrypting RAM on the central processor, using quantum key distribution (QKD), which:
  forms a connection between the RCM, at least one user device and a device for QKD, while the QKD device creates a quantum channel that connects the RCM with the user devices, and the RCM and the user devices are connected via a data transmission network;
  a symmetric cryptographic key is created using a QKD device, while one of the keys is transmitted to the user device for storing in the registry, and the second is transmitted to the RCM,
  when a key is received on the RCM, a backup copy (BC) of its state is created with the help of the central processor, in which the state of its RAM is encrypted at a given time and the encrypted state is transferred for storage to a permanent data storage;
  with
  the restoration of the BC state of the RCM is carried out using the stages at which:
    a command from the user device is formed to restore the BC, while the command contains a cryptographic key with which the required BC was formed, encrypted with a new symmetric key received from the QKD device;
    in response to the received command, the required BC is transferred to the RAM of the RCM;
    with the help of the QKD device, the new symmetric key is transmitted to the central processor of the RCM and the primary key is decrypted;
    the state of the RCM is restored by contacting the central processor with the corresponding cryptographic key to the BC located in RAM and containing the corresponding state of the encrypted RAM of the RCM.

In one of the particular embodiments of the method, the formation of the BC occurs periodically at specified time intervals, or when forming a command using user devices.

In another particular embodiment of the method, the keys are dynamically updated using the QKD device for each new BC.

In another particular embodiment of the method, the QKD device is a separate device or part of the RCM, or the user device.

In another particular embodiment of the method, the QKD device is selected from a group: an expansion board, a chip, or an optical coprocessor.

In another particular embodiment of the method, the generated symmetric inclusions are additionally recorded to a hardware security module (HSM).

In another particular embodiment of the method, the computing device is a virtual machine.

In another particular embodiment of the method, during the formation of the BC, the processor encrypts the state of the RCM through a hypervisor.

In another particular embodiment of the method, additionally, when receiving a key to the RCM from the QKD device, the central processor of the RCM generates a symmetric key with which the preliminary encryption of the BC is performed.

In another particular embodiment of the method, the symmetric key generated by the central processor is encrypted using the key received from the QKD device and stored on the user device.

The claimed technical solution is also implemented using a system for the secure management of backups, with the function of encrypting RAM on the central processor, with the help of QKD, in which:

a connection between the RCM, at least one user device and a device for QKD is formed, while the QKD device creates a quantum channel that connects the RCM with the user devices, and the RCM and the user device are connected via a data transmission network; a symmetric cryptographic key is created using a QKD device, while one of the keys is transmitted to the user device for storing in the registry, and the second is transmitted to the RCM, when a key is received on the RCM, a backup copy (BC) of its state is created with the help of the central processor, in which the state of its RAM is encrypted at a given time and the encrypted state is transferred for storage to a permanent data storage;

with the restoration of the BC state of the RCM is carried out using a command from the user device to restore the BC, while the command contains a cryptographic key with which the required BC was formed, encrypted with a new symmetric key received from the QKD device;

in response to the received command, the required BC is transferred to the RAM of the RCM;

with the help of the QKD device, the new symmetric key is transmitted to the central processor of the RCM and the primary key is decrypted;

the state of the RCM is restored by contacting the central processor with the corresponding cryptographic key to the BC located in RAM and containing the corresponding state of the encrypted RAM of the RCM.

In one of the particular embodiments of the system, the formation of the BC occurs periodically at specified time intervals, or when forming a command using user devices.

In another particular embodiment of the system, the keys are dynamically updated using the QKD device for each new BC.

In another particular embodiment of the system, the QKD device is a separate device or part of the RCM, or the user device.

In another particular embodiment of the system, the QKD device is selected from a group: an expansion board, a chip, or an optical coprocessor.

In another particular embodiment of the system, an additional hardware security module (HSM) provides storage of generated symmetric keys.

In another particular embodiment of the system, the computing device is a virtual machine.

In another particular embodiment of the system, additionally, when receiving a key to the RCM from the QKD device, the central processor of the RCM generates a symmetric key with which the preliminary encryption of the BC is performed.

In another particular embodiment of the system, the symmetric key generated by the central processor is encrypted using the key received from the QKD device and stored on the user device.

In another particular embodiment of the system, during the formation of the BC, the processor encrypts the state of the RCM through a hypervisor.

DETAILED DESCRIPTION OF THE INVENTION

Figure 1A:
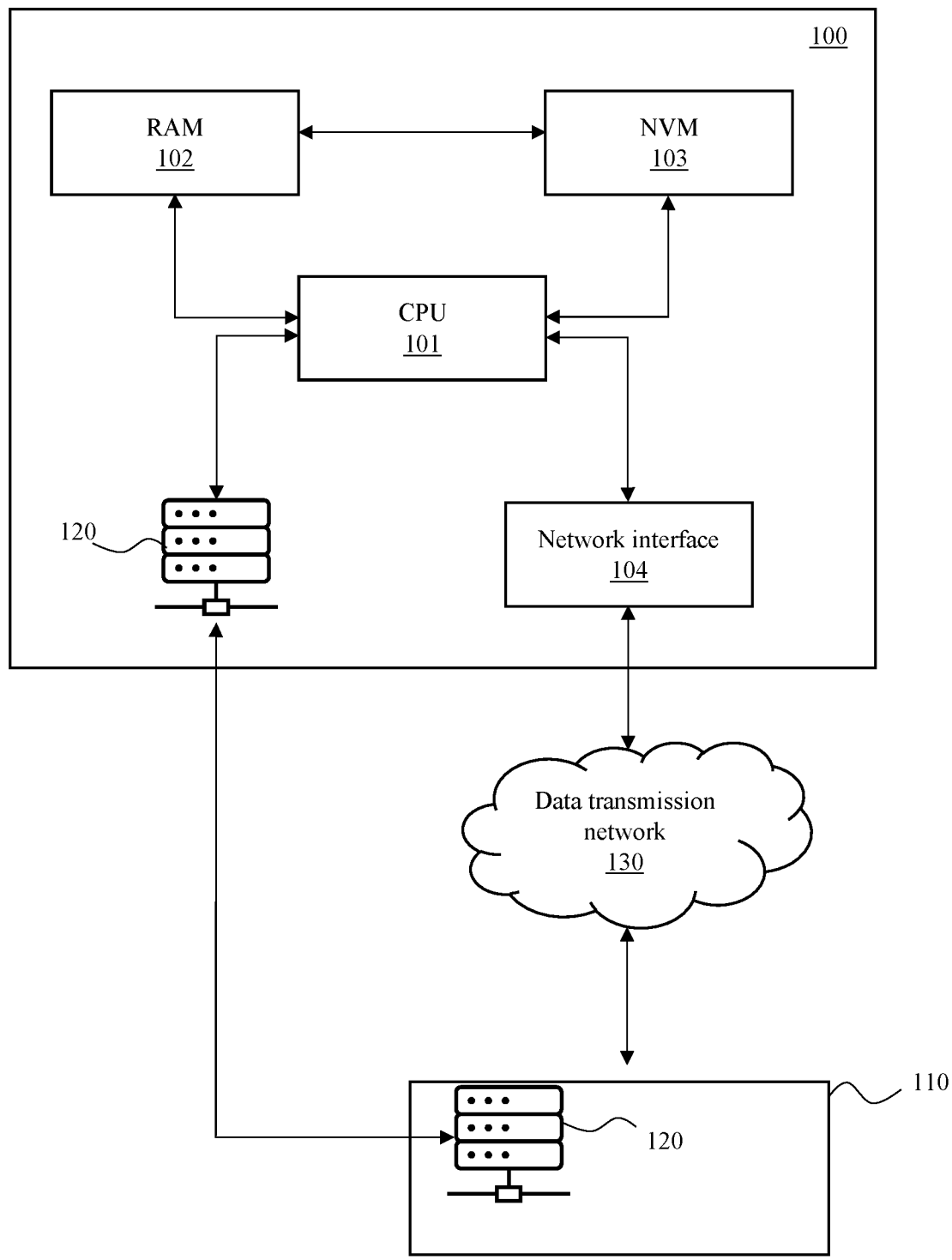
FIG. 1A illustrates the general scheme of the claimed solution.
Figure 1B:
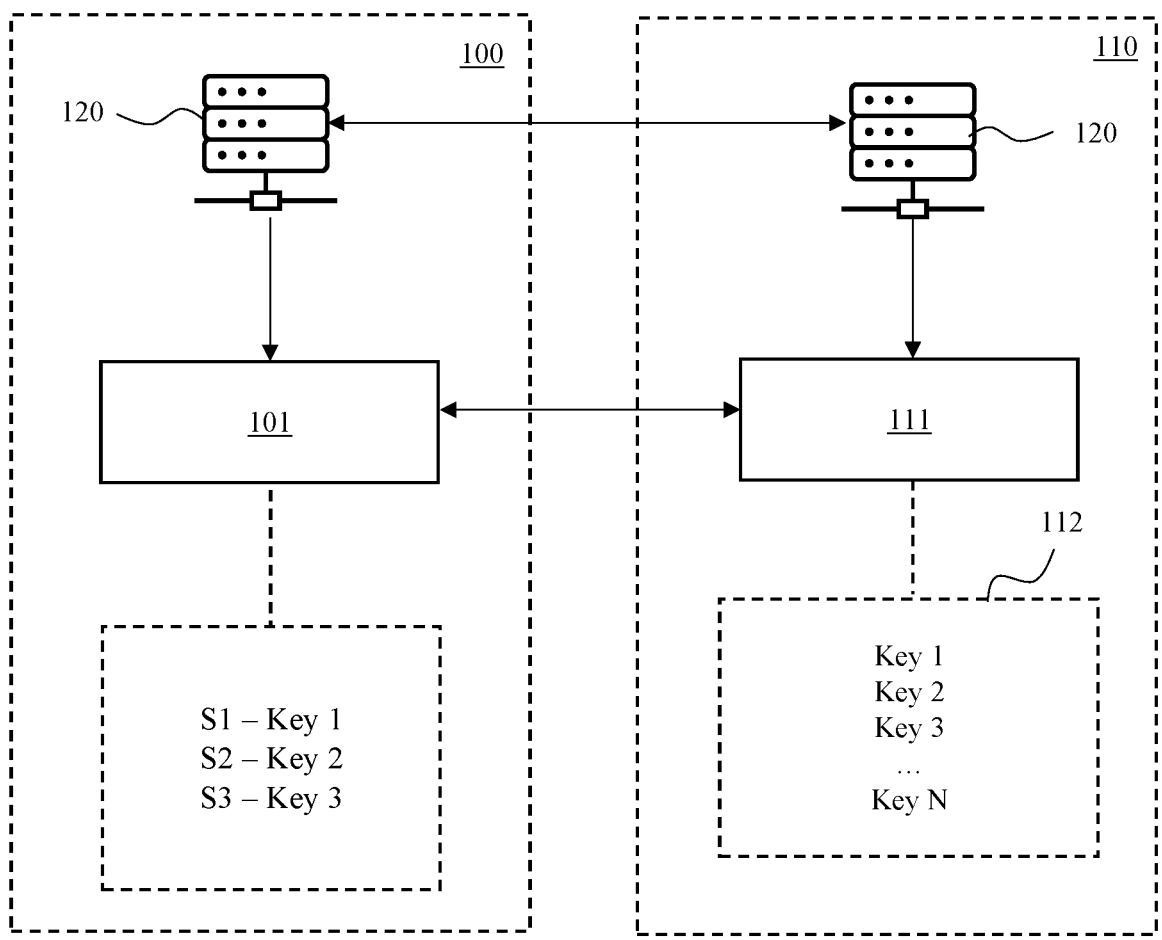
FIG. 1B illustrates the key exchange scheme during the formation of the BC of the RCM.
Figure 1C:
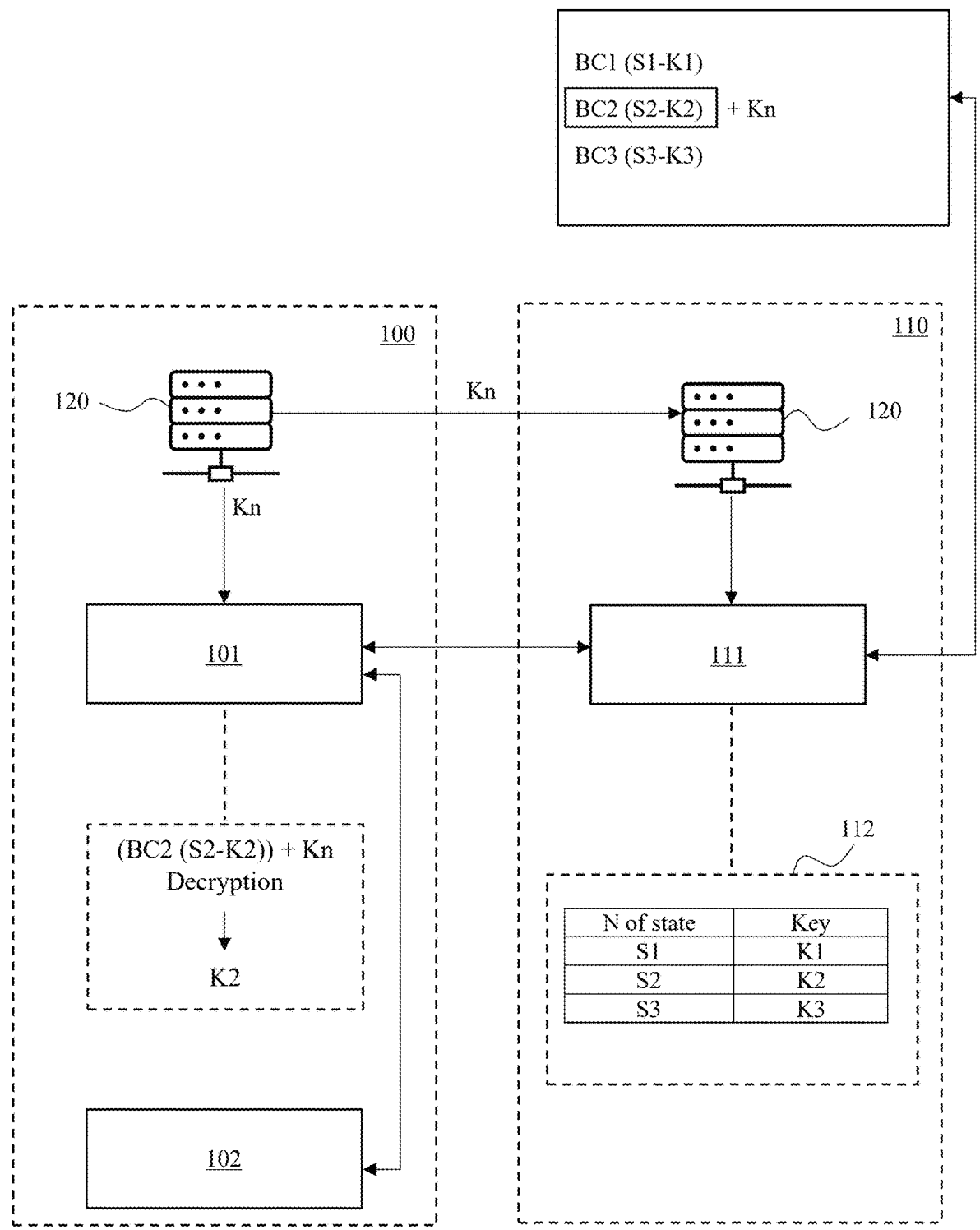
FIG. 1C illustrates the access scheme to the BC.

FIG. 1 shows the general scheme of the claimed solution with RCM (100), user device (110) and QKD device (120) connected by a quantum channel and a data transmission network (130). In general, the RCM (100) is a server that provides interaction with several user devices (110), for example, computers, smartphones, etc. The QKD device (120) can be implemented as an independent device that generates cryptographic symmetric keys, or be part of one of the user devices (110), or part of the RCM.

The interaction of elements of this technical solution is organized by using two types of communication, in particular, a standardized computer network (130), for example, the Internet or Intranet, and a quantum communication channel providing QKD. Quantum Key Distribution (QKD) is a key transfer method that uses quantum phenomena to guarantee secure communication. This method allows two parties connected via an open communication channel to create a common random key, which is known only to them, and use it to encrypt and decrypt messages (https://en.wikipedia.org/wiki/Quantum_key_distribution).

Communication with the RCM (100) is provided through two types of data transmission channels: a quantum channel formed by the QKD device (120), in particular, an optical channel (for example, optical fiber), and a network interface (105), for example, WLAN, Ethernet, etc.

QKD device (120) can be performed as a separate system unit, an expansion board inside a computer (for example, PCI-E), a chip on the motherboard, an optical coprocessor coupled with a central processor using integrated optics. The QKD device (120) provides the quantum formation of symmetric keys, which are formed on the RCM (100) and the user device (110). In a particular embodiment, shown in FIG. 1A, the QKD device (120) is part of the RCM (100) and the user device (110).

The main criterion for the embodiment of the claimed technical solution is the implementation of the RCM (100) with the function of encrypting RAM (102) on the fly using the central processor (101), providing the transmission of information both in RAM (102) and non-volatile memory or NVM (103) in encrypted form. NVM (103) can be any suitable non-volatile type device known in the prior art to provide permanent data storage, for example, HDD, SSD, flash memory, etc.

As shown in FIG. 1B, each time a new symmetric key is formed (120), the corresponding key is stored in the corresponding key registry (112), when it is processed using the processor (111) of the device (110). The registry (112) can be stored both on the user device (110) and on an external device connected to it by any suitable communication method, for example, in a hardware security module (HSM). Hardware Security Module). The second key formed in the RCM circuit (100) is stored in the CPU (101), for example, in the volatile memory of the CPU (101) and is updated when a new QKD device key (120) is formed.

The QKD device keys (120) are generated dynamically in a given time interval or at the request of the user device (110), which, as mentioned above, generates a new symmetric key, which is transmitted via a quantum channel to the RCM (100) to create a BC of its state, and the second key is transmitted to the device (110) to save it in the registry (112). Each key (Key 1, Key 2, Key 3 . . . Key N) corresponds to one state of the RCM (100)—S1, S2, S3 . . . Sn, at a certain point in time.

A "state" stored as BC is understood to be a set of data contained, for example, in RAM, in processor computing registers, on hard disks and file storages. The mentioned data set, due to it being saved at a given time, allows you to return to this state in the future, for example, in case of data loss in emergency situations, loss and replacement of the RCM (100), and when conducting research in the field of computer science to prove reproducibility.

As schematically shown in FIG. 1B, when forming the BC, the current state of the RCM (100) is encrypted using the CPU (101), which receives a symmetric key generated by the QKD device (120) at the appropriate time (Key N). The encrypted state of the RCM (100) in the form of BC can be transferred to storage in NVM (103), user device (110), other RCM associated with the RCM (100), cloud data storage, etc.

Solutions known from the state of the art can be used as encryption algorithms, for example, XOR, AES, PRINCE, Kuznyechik, Magma, etc.

Decryption of the required state, for example, S2, using the CPU (101), is carried out when receiving BC2 containing key K2, which is encrypted with the current key Kn and when the CPU (101) receives the corresponding command from the processor (111) of the device (110) to access key K2 and access the RAM (102) with the stored BC2 in encrypted form. The process will be described in more detail below.

Figure 2:
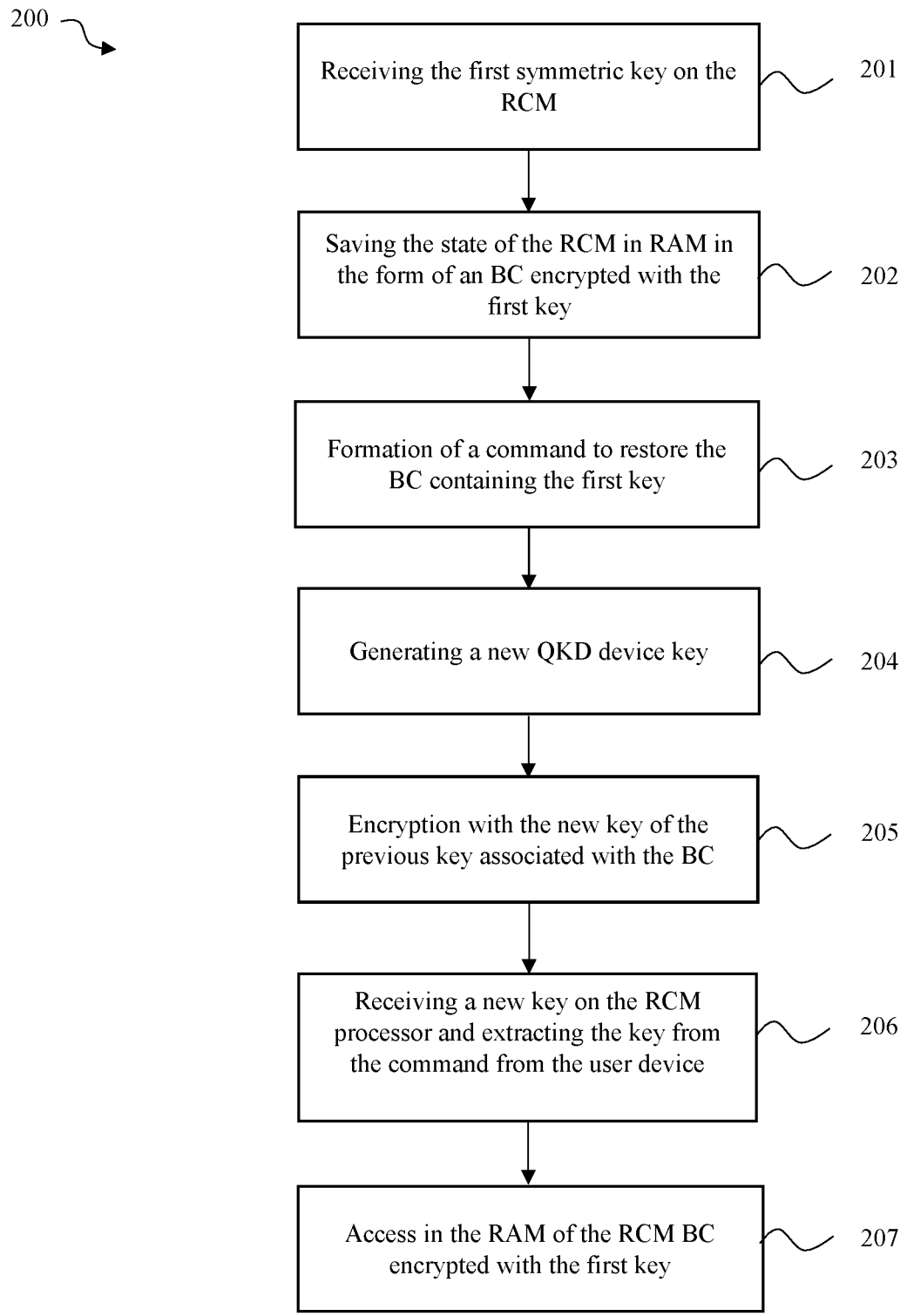
FIG. 2 illustrates the flowchart of the claimed BC control method.

FIG. 2 shows a description of the BC management process using the claimed method (200). At the first stage (201), the QKD device (120) generates a symmetric key. This generation can occur at the time of loading the RCM (100) and initiating a connection to the user device (110), or when the RCM (100) fails, or a forced command from the user device is sent (110). In accordance with the QKD, a symmetric key is generated on the RCM (100) and the user device (110), and stored in the key storage (111) on the user device (110), and in the CPU (101).

The storing of state of the RCM (100) at stage (202) is performed using encryption with the RAM state key of the RCM (100) received from the QKD device (120), thereby forming the BC, which after its formation is stored for further use, for example, in NVM (103) or external data storage.

To manage the created BC (BC1, BC2, BC3, etc.), restoring access to them at stage (203) is carried out by forming a command from the user device (110). When creating such a command, the QKD device (120) generates a new symmetric key (Key N) and transmits it (stage 204) via a quantum channel to the user device (110) and to the CPU (101). On the user device (110), the previous key is encrypted (stage 205), with which the required BC was encrypted, for example, the key K2 associated with BC2.

At stage (206), the RCM (100) receives the mentioned command to access BC2, which contains key K2 encrypted with the new key Kn generated in real time by the QKD device (120). The CPU (101), having received a symmetric Kn key from the QKD device (120) and a command from the user device (110), accesses the K2 key to restore BC2.

The encrypted command and cryptographic keys do not leave the CPU circuit (101), which excludes the possibility of their interception during data exchange. All operations to decrypt the command from the device (110) are performed strictly in the CPU circuit (101).

At stage (207), the CPU (101) uses the extracted symmetric key K2 to access the required BC2. The state of the RCM (100) stored in BC2 is also transmitted in encrypted form from NVM (103) (or other BC storage) to RAM (102), which is accessed by the CPU (101) to restore the state of the RCM (100) stored in BC2.

Also, in another embodiment, CPU (101) can generate a cryptographic key, in particular, a symmetric key, with which the preliminary encryption of the BC is performed, and only after that the encryption occurs using a symmetric key obtained from the QKD device (120). The key generated by the CPU (101) and encrypted with the key from the QKD device (120) is also transferred to the key registry (111) on the user device (110).

If the user device (110) is executed as a virtual machine, encryption can also be carried out through a hypervisor controlled by the CPU (101) and providing an environment for interaction with virtual machines controlled through the RCM (100).

In the key registry (111), each key may contain additional information about the status of the RCM (100) associated with the corresponding BC. Also, in the registry (111) there may be a configuration of the RCM to replace it with a similar one in case of failure of one of the RCMs.

Figure 3:
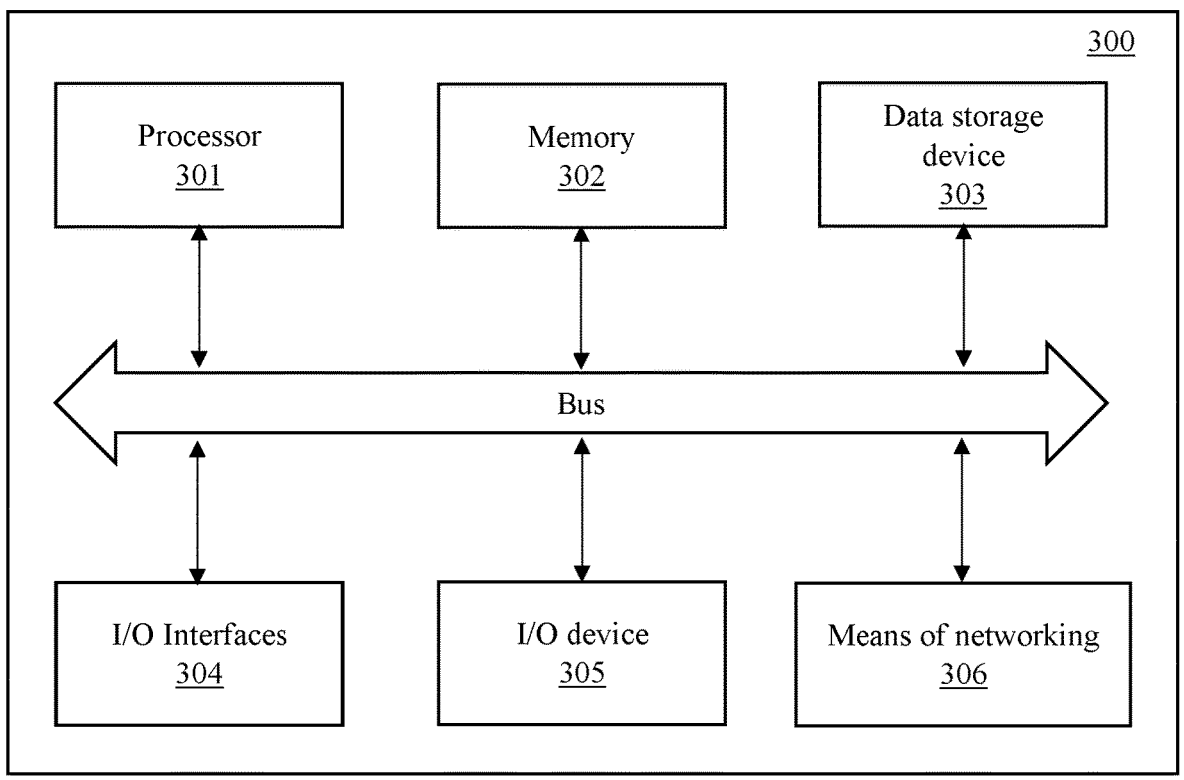
FIG. 3 illustrates the general view of the computing system.

FIG. 3 shows a general example of a computing system based on a computing device (300), for example, a computer, server, laptop, smartphone, etc., which can be used for the full or partial embodiment of the claimed method (100). In general, the device (300) contains components such as: one or more processors (301), at least one RAM (302), a permanent data storage device (303), I/O interfaces (304), I/O facility (305), and networking facilities (306).

The processor (301) of the device performs the basic computing operations necessary for the functioning of the device (300) or one or more of its components. The processor (301) executes the necessary machine-readable commands contained in the RAM (302).

Memory (302), as a rule, is embodied as RAM and contains the necessary software providing the required functionality. The data storage device (303) can be embodied as HDD, SSD disks, raid array, network storage, flash memory, optical information drives (CD, DVD, MD, Blue-Ray disks), etc. The device (303) allows long-term storage of various types of information, for example, request processing history (logs), user IDs, camera data, images, etc.

Interfaces (304) are standard means for connecting and working with cameras (20) or other computing devices. Interfaces (304) can be, for example, USB, RS232, RJ45, LPT, COM, HDMI, PS/2, Lightning, FireWire, etc. The choice of interfaces (304) depends on the specific design of the device (300), which can be a personal computer, mainframe, server cluster, thin client, smartphone, laptop, etc., and connected third-party devices.

As a means of data I/O (305), the following devices can be used: keyboard, joystick, display (touch display), projector, touchpad, mouse manipulator, trackball, light pen, speakers, microphone, etc.

The means of network interaction (306) are selected from a device that provides network reception and data transmission, for example, an Ethernet card, a WLAN/Wi-Fi module, a Bluetooth module, a BLE module, an NFC module, an IrDA, an RFID module, a GSM modem, etc. Using the means (306), the organization of data exchange over a wired or wireless data transmission channel is provided, for example, WAN, PAN, LAN (LAN), Intranet, Internet, WLAN, WMAN or GSM, quantum data transmission channel, satellite communication, etc.

The components of the device (300) are usually interfaced via a common data bus.

In these application materials, the preferred embodiment of the claimed technical solution was presented, which should not be used as limiting other, private embodiments of its implementation, which do not go beyond the requested scope of legal protection and are obvious to specialists in the relevant field of technology.

The invention claimed is:

1. A computer-implemented method for securely managing backups of states of remote computing machines (RCM), with a function of encrypting RAM on a central processor, using quantum key distribution (QKD), comprising the following steps:
    a connection is formed between the RCM, at least one user device and a device for QKD, while the QKD device creates a quantum channel that connects the RCM with a user devices, and the RCM and the user devices are connected via a data transmission network;
    a pair of symmetric cryptographic keys is created using a QKD device, while one of the keys is transmitted to the user device for storing in the registry, and the second key is transmitted to the RCM,
    when the key is received on the RCM, a backup copy (BC) of its state is created with the help of the central processor, in which the state of its RAM is encrypted at a given time and an encrypted state is transferred for storage to a permanent data storage;
    wherein
    the restoration of the BC state of the RCM is carried out using the following stages:
        a command from the user device is formed to restore the BC, while the command contains a cryptographic key with which the required BC was formed, encrypted with a new symmetric key received from the QKD device;
        in response to the received command, the required BC is transferred to the RAM of the RCM;
        with the help of the QKD device, the new symmetric key is transmitted to the central processor of the RCM and a primary key is decrypted;
        the state of the RCM is restored by contacting the central processor with the corresponding cryptographic key to the BC located in the RAM and containing the corresponding state of the encrypted RAM of the RCM.

2. The method according to claim 1, in which the formation of the BC occurs periodically at specified time intervals, or when forming a command using user devices.

3. The method according to claim 1, in which the RCM is a server.

4. The method according to claim 2, in which the keys are dynamically updated using the QKD device for each new BC.

5. The method according to claim 1, in which the QKD device is a separate device or part of the RCM, or the user device.

6. The method according to claim 5, in which the QKD device is selected from the group:
    expansion board, chip, or optical coprocessor.

7. The method according to claim 1, in which the generated symmetric keys are additionally recorded in the hardware security module (HSM).

8. The method according to claim 1, in which the computing device is a virtual machine.

9. The method according to claim 1, in which additionally, when receiving a key to the RCM from the QKD device, the central processor of the RCM generates a symmetric key with which the preliminary encryption of the BC is performed.

10. The method according to claim 9, in which the symmetric key generated by the central processor is encrypted using the key received from the QKD device and stored on the user device.

11. The method according to claim 8, in which, when forming the BC, the processor encrypts the state of the RCM through a hypervisor.

12. A system for the secure management of RCM backups, with the function of encrypting RAM on the central processor, with the help of QKD, in which:
    a connection is formed between the RCM, at least one user device and a device for QKD, while the QKD device creates a quantum channel that connects the RCM with the user devices, and the RCM and the user devices are connected via a data transmission network;
    a pair of symmetric cryptographic keys is created using a QKD device, while one of the keys is transmitted to the user device for storing in the registry, and the second is transmitted to the RCM,
    when the key is received on the RCM, a backup copy (BC) of its state is created with the help of the central processor, in which the state of its RAM is encrypted at a given time and an encrypted state is transferred for storage to a permanent data storage;
    wherein
    the restoration of the BC state of the RCM is carried out using the following stages:
        a command from the user device to restore the BC, while the command contains a cryptographic key with which the required BC was formed, encrypted with a new symmetric key received from the QKD device;
        in response to the received command, the required BC is transferred to the RAM of the RCM;
        with the help of the QKD device, the new symmetric key is transmitted to the central processor of the RCM and a primary key is decrypted;
        the state of the RCM is restored by contacting the central processor with the corresponding cryptographic key to the BC located in RAM and containing the corresponding state of the encrypted RAM of the RCM.

13. The system according to claim 12, in which the formation of the BC occurs periodically at specified time intervals, or when forming a command using user devices.

14. The system according to claim 12, in which the RCM is a server.

15. The system according to claim 13, in which the keys are dynamically updated using the QKD device for each new BC.

16. The system according to claim 12, in which the QKD device is a separate device or part of the RCM, or the user device.

17. The system according to claim 16, in which the QKD device is selected from the group:
expansion board, chip, or optical coprocessor.

18. The system according to claim 12, which additionally contains a hardware security module (HSM) that provides storage of generated symmetric keys.

19. The system according to claim 12, in which the computing device is a virtual machine.

20. The system according to claim 12, in which additionally, when receiving a key to the RCM from the QKD device, the central processor of the RCM generates a symmetric key with which the preliminary encryption of the BC is performed.

21. The system according to claim 20, in which the symmetric key generated by the central processor is encrypted using the key received from the QKD device and stored on the user device.

22. The system according to claim 19, in which, when forming the BC, the processor encrypts the state of the RCM through a hypervisor.

* * * * *